No. 855,255. PATENTED MAY 28, 1907.
H. F. LOESCHNER & M. LESAR.
CAR JACK.
APPLICATION FILED DEC. 6, 1906.
Fig. 1. Fig. 2.
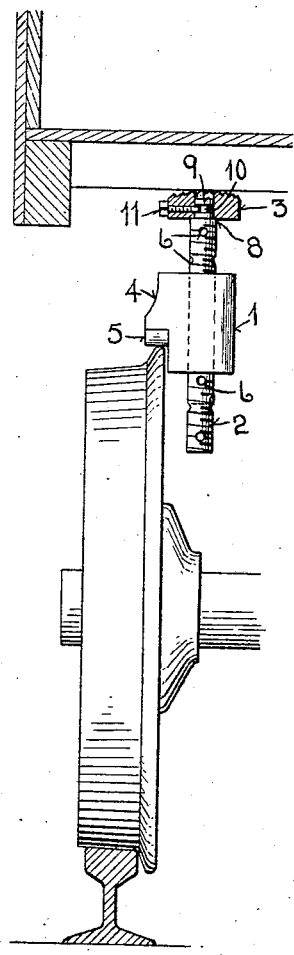
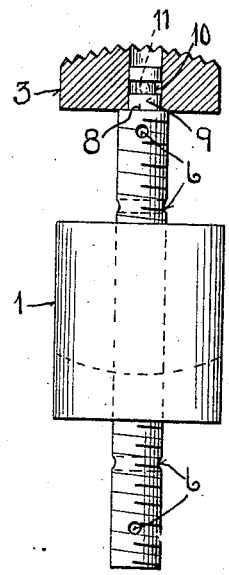
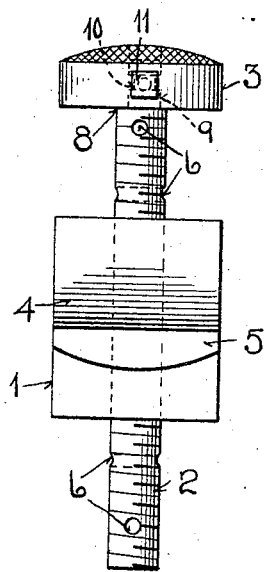
Fig. 3.
Witnesses
L. B. James
C. H. Griesbauer
Inventors
Henry F. Loeschner
Moses Lesar
by H. B. Willson & Co.
Attorneys

UNITED STATES PATENT OFFICE.

HENRY F. LOESCHNER AND MOSES LESAR, OF TAMMS, ILLINOIS.

CAR-JACK.

No. 855,255.　　　Specification of Letters Patent.　　　Patented May 28, 1907.

Application filed December 6, 1906. Serial No. 346,600.

*To all whom it may concern:*

Be it known that we, HENRY F. LOESCHNER and MOSES LESAR, citizens of the United States, residing at Tamms, in the county of Alexander and State of Illinois, have invented certain new and useful Improvements in Car-Jacks; and we do declare the following to be a full, clear, and exact description of the invention, such as will enable others skilled in the art to which it appertains to make and use the same.

Our invention is an improved car jack, especially adapted for use when removing and replacing brasses for car journals, and it consists in the construction, combination and arrangement of devices hereinafter described and claimed.

In the accompanying drawings,—Figure 1 is an elevation, partly in section, of our improved car jack, showing the same in use; Fig. 2 is a similar view of the same from the inner side thereof; and Fig. 3 is an elevation at right angles to Fig. 1, showing the convex under shoulder of the head.

Our improved jack comprises a body 1, a screw 2, and a head 3. The body 1 has a vertical, screw-threaded opening, through which the screw extends, and with which the said screw engages, and said body is provided on its inner side with an extension or projection 4, which forms a shoulder to bear on the upper side of the flange of a car wheel. The said shoulder 5 has its under surface convex and round, as shown.

The screw 2 is provided at suitable points with openings 6 which extend therethrough, and in which a rod or other suitable device may be inserted to turn the said screw and cause it to travel with respect to the body. The head 3 is swiveled on the upper end of the screw, the latter being shouldered at 8 to form a cylindrical projection 9, which projection is provided with an annular circumferential groove 10, which receives the engaging point of the set-screw 11, with which the recess is provided. Said head is here shown as circular in form with its upper side convex, and milled to facilitate its engagement with the under side of the car body.

In the event that the car should be moved while the jack is in use, by another car or an engine being in contact therewith, which is likely to occur, the convex engaging surface of the shoulder 5, which bears on the wheel flange, will, by the turning of the wheel, coact therewith to unship and dislodge the jack and prevent injury thereto, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention, as defined by the appended claims.

Having thus described our invention, what we claim as new, and desire to secure by Letters-Patent, is,—

The herein-described car jack comprising the bit having the vertical screw-threaded opening, and the laterally-projecting shoulder on one side having the underside convex to bear on the flange of a wheel, the screw engaging the opening of the bit, extending therethrough and provided with means to facilitate the turning of the screw, and the head swiveled to the upper end of the screw and having the convex milled upper surfaces.

In testimony whereof we have hereunto set our hand in presence of two subscribing witnesses.

HENRY F. LOESCHNER.
　　　　MOSES LESAR.

Witnesses:
　CON MANLEY,
　WALTER L. SAUEB.